Nov. 11, 1952

R. F. MALLINA 2,617,704

RECORDING SYSTEM

Filed July 15, 1947

3 Sheets-Sheet 1

INVENTOR
R. F. MALLINA
BY R. Marino
ATTORNEY

Nov. 11, 1952 R. F. MALLINA 2,617,704

RECORDING SYSTEM

Filed July 15, 1947

3 Sheets-Sheet 2

INVENTOR
R. F. MALLINA
BY R. Marino
ATTORNEY

Nov. 11, 1952 R. F. MALLINA 2,617,704

RECORDING SYSTEM

Filed July 15, 1947 3 Sheets-Sheet 3

INVENTOR
R. F. MALLINA
BY R. Marino
ATTORNEY

Patented Nov. 11, 1952

2,617,704

UNITED STATES PATENT OFFICE 2,617,704

RECORDING SYSTEM

Rudolph F. Mallina, Hastings-on-Hudson, N. Y., assignor to Bell Telephone Laboratories, Incorporated, New York, N. Y., a corporation of New York

Application July 15, 1947, Serial No. 761,051

4 Claims. (Cl. 346—44)

This invention relates to magnetic recording systems and particularly to systems for assembling magnetically-recorded data.

Magnetic recorders are a convenient means of recording data since a large amount of information may be recorded on a small bulk of magnetic medium. Characters, such as letters or numbers, may be recorded as magnetized spots, the position, magnetic characteristics, or other characteristics of each spot indicating the particular character represented by it. Items of information of any kind may be represented by groups of such spots. However, such records are not visible and visual or audible reproductions of them by the usual means are not intelligible. New techniques are required to handle data recorded in this manner.

The present invention discloses a system for automatically assembling related items of information recorded in random sequence on a magnetic medium. A feature of the invention is a means whereby the recorders on which the data is originally recorded may be used for reclassifying the data. Another feature of the invention is that none of the magnetic media used need be removed from the recording devices in the processes of assembling the data.

These and other features of the invention will be more apparent from the accompanying description, the appended claims, and the drawings, in which:

Figure 1:
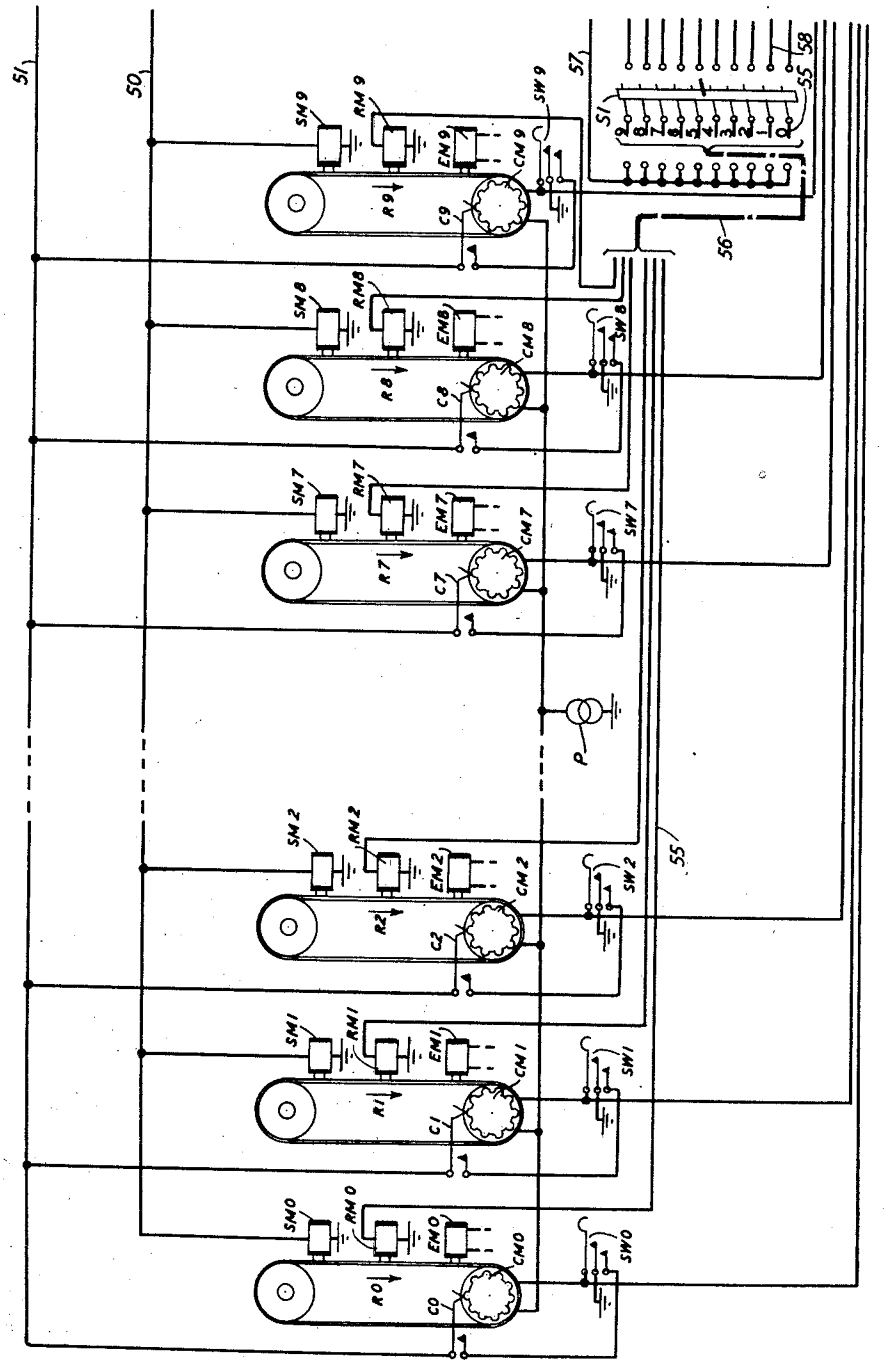
Fig. 1 shows the magnetic recorders, the tapes of which contain the data to be assembled.
Figure 2:
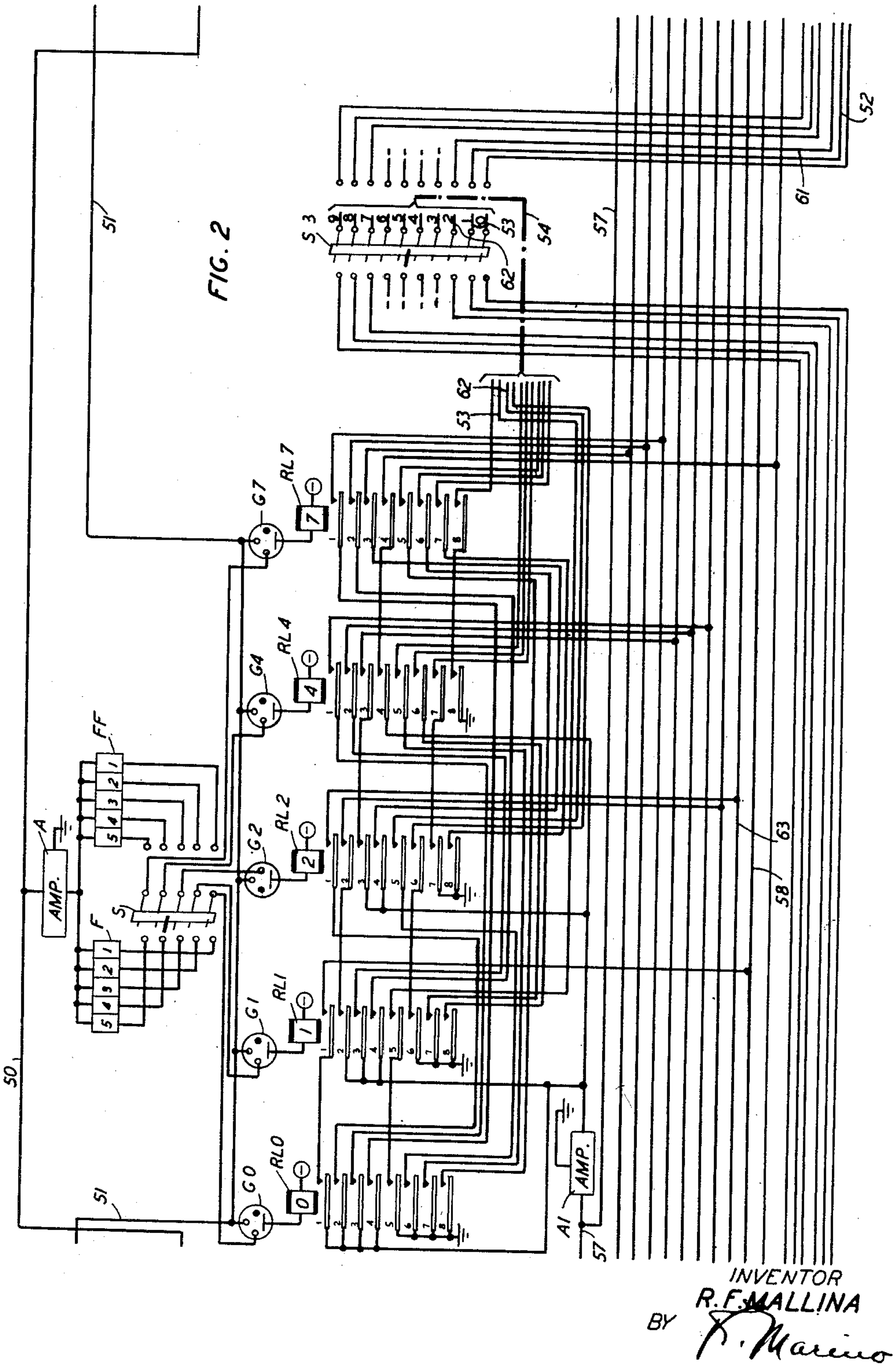
Fig. 2 shows the selecting circuits.
Figure 3:
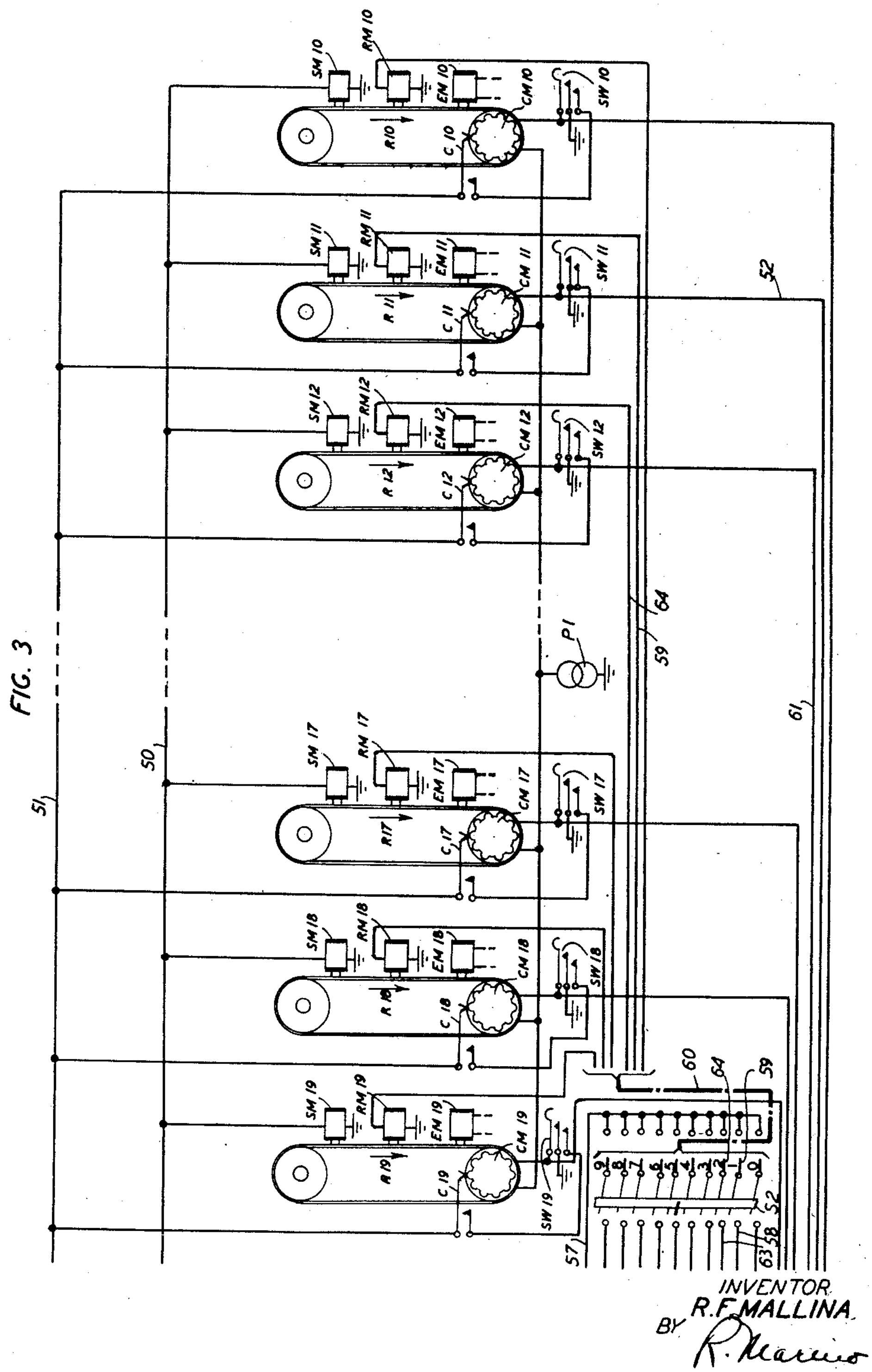
Fig. 3 shows the magnetic recorders on which assembled data is recorded.

To completely disclose the invention, Fig. 2 should be placed to the right of Fig. 1 and Fig. 3 to the right of Fig. 2.

In the present embodiment of the invention, the data to be assembled consists of groups of sequential magnetized spots representing digits on the tapes of the magnetic recorders R0 . . . R9, each group constituting an item of data. Each magnetized spot is the record of a combination of two electrical frequencies, the digit represented by said spot being indicated by the particular combination of frequencies. The frequencies used for recording the first digit of each group are chosen from five distinctive frequencies and the frequencies used for recording the second digit of each group are chosen from another five frequencies beyond the range of the frequencies used for recording the first digit. These two digits in each group are indicative of the character of the information represented by subsequent digits of the group. The subsequent digits are recorded by combinations of frequencies beyond the range of the frequencies used for the first two digits. The recorders R0 . . . R9 may be used to record the original data or it may be recorded on the tapes of said recorders by other means.

The five band-pass filters F1 . . . F5 are each adapted to pass only one of the five frequencies used to form the record of the first digit in each group. The five similar filters FF1 . . . FF5 are each adapted to pass only one of the five frequencies used to form the record of the second digit of each group. None of said filters pass the frequencies used to form the record of the remainder of the digits in each group.

The magnetic recorders R10 . . . R19 are provided for re-recording the assembled information and are similar to the recorders R0 . . . R9. Each recorder has a reproducing magnet, a reproducing and recording magnet, and an erasing magnet, such as the magnets SM0, RM0 and EM0, respectively, of recorder R0. Each of the recorders also has the usual driving motor (indicated but not shown) which, in addition to driving the tape of the recorder, also actuates a cam, such as the cam CM0 of recorder R0, which opens the associated contacts C0 after each group of recorded signals has passed the magnet RM0 and before another group of recorded signals has reached the magnet SM0.

To assemble the items of information recorded on the tapes of the recorders R0 . . . R9, switches S1 and S2 are thrown to the left and switch S3 is thrown to the right. If the items are to be assembled in accordance with the first digit of each item, switch S is thrown to the left. If they are to be assembled in accordance with the second digit, switch S is thrown to the right. It will be assumed that the items are first to be assembled in accordance with the first digit and switch S, therefore, is thrown to the left.

The items recorded on any one of the recorders R0 . . . R9 may now be assembled. Assuming that recorder R0 is chosen, switch SW0 is closed, completing the circuit of the driving motor of said recorder from the power source P through said driving motor and contacts of said switch to ground, energizing said motor, which drives the tape of recorder R0 in the direction of the arrow. When the first signal of a group passes the reproducing magnet SM0, the two frequencies used in recording said signal are induced in said magnet and transmitted over conductor 50 to amplifier A, which may be of any suitable type, are amplified therein and applied to the filters F1 . . . F5 and FF1 . . . FF5. Assuming that said signal represents the digit "1" recorded by the two frequencies to which filters F1 and F2 respond, one of said frequencies is transmitted through filter F1 and contacts of switch S to the starting anode of the triode gas tube G0. The main anode of said tube is supplied with potential from battery through the winding of relay RL0 which, while sufficient to maintain conduction in said tube, is insufficient to initiate conduction. When, however, the potential of the starting anode of said tube is raised by a positive cycle of the frequency applied to it through filter F1, said tube fires and conducts over a circuit extending from battery through the winding of relay RL0, the anode-cathode space of said tube, conductor 51, contacts C0, which are now closed by cam CM0, and contacts of switch SW0, to ground, operating relay RL0. Likewise, the other of said frequencies transmitted through filter F2 and contacts of switch S to the starting anode of gas tube G1, which is arranged similarly to tube G0, causes said tube to conduct over a circuit extending from battery through the winding of relay RL1 and the anode-cathode space of said tube, to ground on conductor 51, operating relay RL. By the operation of relays RL0 and RL1, a circuit is completed from the power source P1 through the driving motor of recorder R11, conductor 52, No. 1 contacts of switch S3, conductor 53 within bracket 54, No. 5 contacts of relay RL1, and No. 5 contacts of relay RL0 to ground, energizing said motor to drive the tape of said recorder.

When subsequent signals of the first item of data recorded on the tape of recorder R0 pass the reproducing magnet SM0, frequencies are induced in said magnet which are amplified in amplifier A, but none of said frequencies are frequencies which are passed by any of the filters F1 . . . F5. When signals on the tape of recorder R0 pass the magnet RM0, however, frequencies are induced in said magnet which are transmitted over conductor 55 within bracket 56 through No. 0 contacts of switch S1 and conductor 57 to amplifier A1, which may be of any suitable type, and amplified therein. The amplified frequencies pass through No. 1 contacts of relay RL0, No. 1 contacts of relay RL1, conductor 58, No. 1 contacts of switch S2, conductor 59 within bracket 60, and the winding of the recording magnet RM11 to ground. Signals corresponding to those on the tape of recorder R0 are thereby recorded on the tape of recorder R11. When the last signal of the group of signals representing an item of data on the tape of recorder R0 has passed magnet RM0, cam CM0 opens contacts C0. The circuits of relays RL0 and RL1 are thereby opened and said relays released, opening the circuit of and stopping the driving motor of recorder R11. The gas tubes G0 and G1 included in the circuits of relays RL0 and RL1 cease to conduct.

When the next signal recorded on the tape of recorder R0, which is the first signal of another item of data, passes the magnet SM0, an action takes place similar to that already described. Assuming, however, that said signal represents the digit "2" recorded by frequencies to which filters F1 and F3 respond, relays RL0 and RL2 are operated in the manner described above completing a circuit from the power source P1 through the driving motor of recorder R12, conductor 61, No. 2 contacts of switch S2, conductor 62 within bracket 54, No. 5 contacts of relay RL2, and No. 6 contacts of relay RL0 to ground, energizing said driving motor to drive the tape of recorder R12. Signals on the tape of recorder R0 now passing magnet RM0 induce frequencies which are amplified by amplifier A1, as described above, and transmitted through No. 2 contacts of relay RL0, No. 1 contacts of relay RL2, conductor 63, No. 2 contacts of switch S2, conductor 64 within bracket 60, and the winding of magnet RM12 to ground. The group of signals of the second item of data on the tape of recorder R0 is thereby rerecorded on the tape of recorder R12. When the contacts C0 are opened by cam CM0, the circuits of relays RL0 and RL2 are opened and said relays released stopping the motor of recorder R12. Gas tubes G0 and G2, included in said circuits, cease to conduct.

In like manner, each group of signals representing an item of data on the tape of recorder R0 is rerecorded on a selected one of the recorders R10 . . . R19, the particular recorder selected corresponding to the first digit of the group. All items in which the first digit is "1" are thereby assembled on the tape of recorder R11, all items in which the first digit is "2" are assembled on the tape of recorder R12, etc. When all items on the tape of recorder R0 have been thus rerecorded and assembled, said recorder may be stopped by opening switch SW0 and any other of the recorders R0 . . . R9 put into operation by closing its associated switch. The operation described above will then be repeated with respect to the second recorder. Thus all items recorded on the tapes of the recorders R0 . . . R9 are assembled on the tapes of recorders R10 . . . R19 in accordance with the first digit in each item, each of recorders R10 . . . R19 now having recorded therein all the items of the original record which have the same first digit.

During the operation of recorders R0 . . . R9 the erasing magnets EM0 . . . EM9 may be energized by an suitable means, thus erasing the original record of each item after it has been transmitted and rerecorded on one of the recorders R10 . . . R19. Recorders R0 . . . R9 are now free to serve for a second assembling of the rerecorded data in accordance with the second digit in each item. Switches S1 and S2 are thrown to the right and switch S3 to the left. Switch S is thrown to the right. Any one of the recorders R10 . . . R19, for example, recorder R17, may now be started by closing switch SW17. A signal representing the first digit of a group recorded on the tape of said recorder passing magnet SM17 will induce frequencies therein but said frequencies are not those to which any of the filters FF1 . . . FF5 respond. When the signal representing the second digit passes magnet SM17, however, frequencies are induced therein which, transmitted over conductor 50 and amplified by amplifier A, are passed by two of the filters FF1 . . . FF5, actuating two of the gas tubes G0 . . . G7 and two of the relays RL0 . . . RL7, thereby selecting one of the recorders R0 . . . R9 and recording signals thereon in the manner already described. Thus, the items are assembled in accordance with the first two digits in each item. For example, recorder R17 has recorded therein all the items having the first digit "7." When these are transferred to recorders R0 . . . R9 in the manner described above, recorder R0 contains all the items commencing with the digits "70," recorder R1 has all the items commencing with the digits "71," etc. During the transmission of signals from recorders R10 . . . R19, the erasing magnets of said recorders may be energized, erasing the signals from the tapes of said recorders, which are then ready to receive signals from recorders R0 . . . R9 in another assembling operation similar to those described above. It is obvious that, by the provision of additional filters similar to filters FF1 . . . FF5 but responsive to frequencies employed to record other signals in each group, the data may be further assembled in accordance with other indices and that this process may be repeated indefinitely with as many indices as desired.

While in the present embodiment of the invention, ten recorders are provided in each of the groups R0 . . . R9 and R10 . . . R19, any number of recorders may be used to suit the character of the indices by which the data is to be assembled and said indices may, of course, have any significance.

While I have illustrated my invention by a particular embodiment thereof, it is not limited to said embodiment nor to the specific arrangements disclosed herein. It will be apparent to one skilled in the art that various applications, modifications, and arrangements other than those disclosed herein, are within the scope of the invention. The terms and expressions which I have employed in reference to this invention and its elements are used as terms of description and not of limitation, and I have no intention in the use of such terms and expressions of excluding thereby equivalents of the features shown and described or portions thereof but, on the contrary, intend to include therein any and all equivalents and modifications which may be employed without departing from the spirit of the invention.

What is claimed is:

1. In a recording system, a plurality of first magnetic recorders each having signals on the magnetic medium thereof, a plurality of second magnetic recorders, means responsive to signals on the media of each of said first magnetic recorders for successively selecting one of said second recorders, means for transferring the signals from the media of said first recorders to the media of said second recorders, means for removing the signals from the media of said first recorders, means responsive to signals on the media of each of said second recorders for successively selecting one of said first recorders, and means for transferring the signals from the media of said second recorders to the media of said first recorders.

2. In a recording system, a plurality of first recorders having signals recorded on the media thereof, said signals comprising frequencies, a plurality of second magnetic recorders, means responsive to the frequencies of the signals on the media of each of said first recorders for selecting one of said second recorders, means for transferring the signals from the media of said first recorders to the media of said second recorders, means for removing the signals from the media of said first recorders, means responsive to the frequencies of the signals on the media of each of said second recorders for selecting one of said first recorders, and means for transferring the signals from the media of said second recorders to the media of said first recorders.

3. A system for classifying recorded items of intelligence having characteristics common to a plurality of said items, comprising in combination two groups of devices, each of said devices being adapted to be actuated either as a recorder or as a reproducer of recorded items, means for successively actuating the devices of either of said groups as reproducers of said items or as recorders thereof, and means for selecting said devices actuated as recorders to record said items in accordance with the characteristics of the items reproduced by the devices actuated as reproducers.

4. A system for classifying recorded items of intelligence having one characteristic common to some of said items and another characteristic common to others of said items, comprising in combination two groups of devices, each of said devices being adapted to be actuated either as a recorder or as a reproducer of recorded items, means for actuating the devices of a first group of said devices as reproducers of said items and of a second group of said devices as recorders, means for selecting the devices of said second group to record said items in accordance with the characteristics of the items reproduced by said first group, means for actuating the devices of said second group of devices as reproducers of said items and for actuating the devices of said first group of devices as recorders, and means for selecting the devices of said first group to record said items in accordance with the characteristics of the items reproduced by the devices of said second group.

RUDOLPH F. MALLINA.

REFERENCES CITED

The following references are of record in the file of this patent:

UNITED STATES PATENTS

| Number | Name | Date |
|---|---|---|
| 2,080,100 | Tauschek | May 11, 1937 |
| 2,165,924 | Goodrum et al. | July 11, 1939 |
| 2,165,925 | Goodrum et al. | July 11, 1939 |
| 2,268,203 | Carpenter et al. | Dec. 30, 1941 |
| 2,298,608 | Bates | Oct. 13, 1942 |
| 2,380,894 | Colman | July 31, 1945 |
| 2,401,888 | Smith | June 11, 1946 |
| 2,406,353 | Myers | Aug. 27, 1946 |
| 2,427,383 | Bryce | Sept. 16, 1947 |
| 2,579,831 | Keinath | Dec. 25, 1951 |